(No Model.) 7 Sheets—Sheet 1.

R. L. HATTERSLEY & J. HILL.
LOOM.

No. 383,465. Patented May 29, 1888.

WITNESSES.
Samuel Hey.
W. Newholme.

INVENTORS.
Rich L. Hattersley
James Hill.

N. PETERS. Photo-Lithographer, Washington, D. C.

(No Model.) 7 Sheets—Sheet 2.

R. L. HATTERSLEY & J. HILL.
LOOM.

No. 383,465. Patented May 29, 1888.

WITNESSES,
Samuel Hey.
H. Newsholme.

INVENTORS,
Rich L Hattersley.
James Hill.

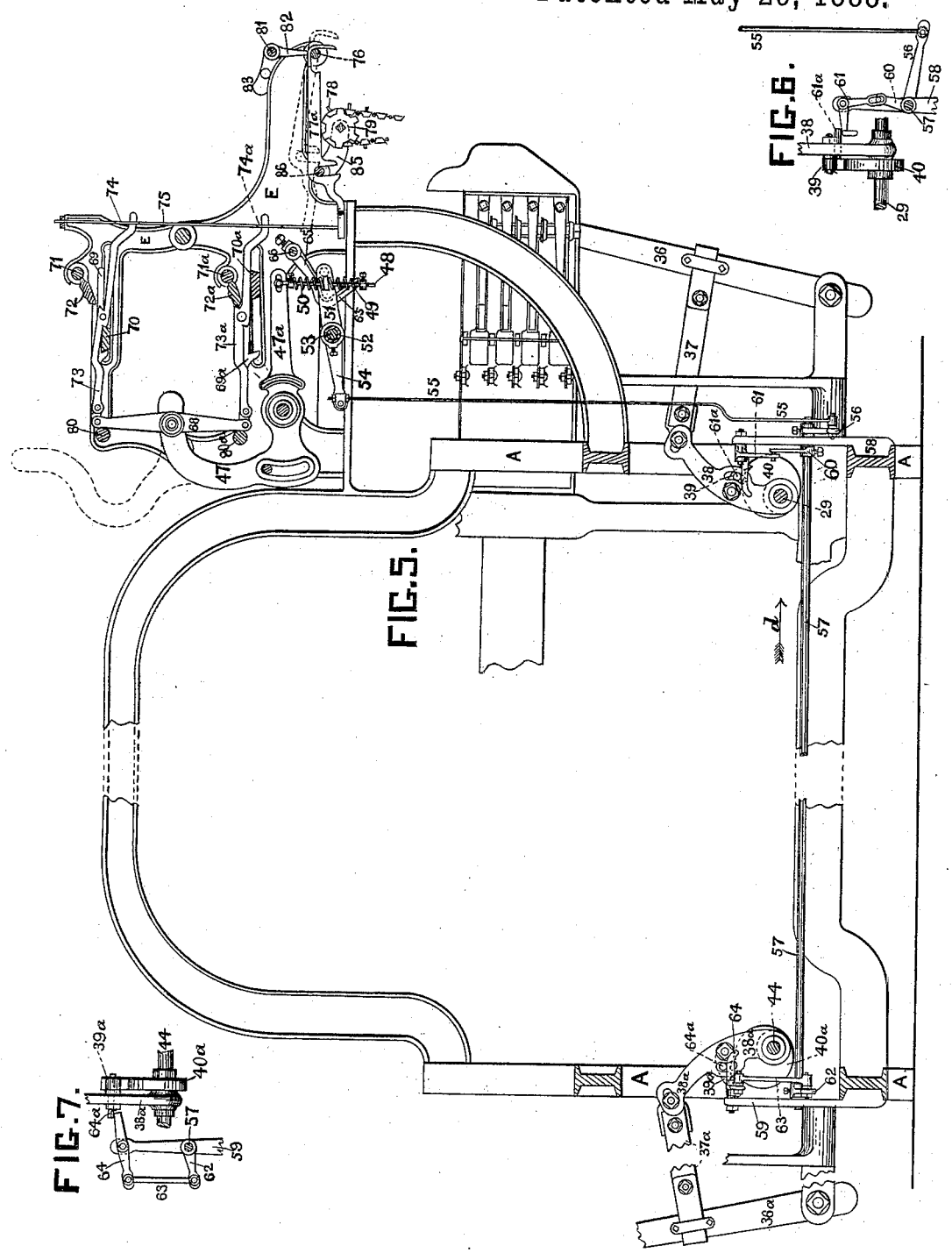

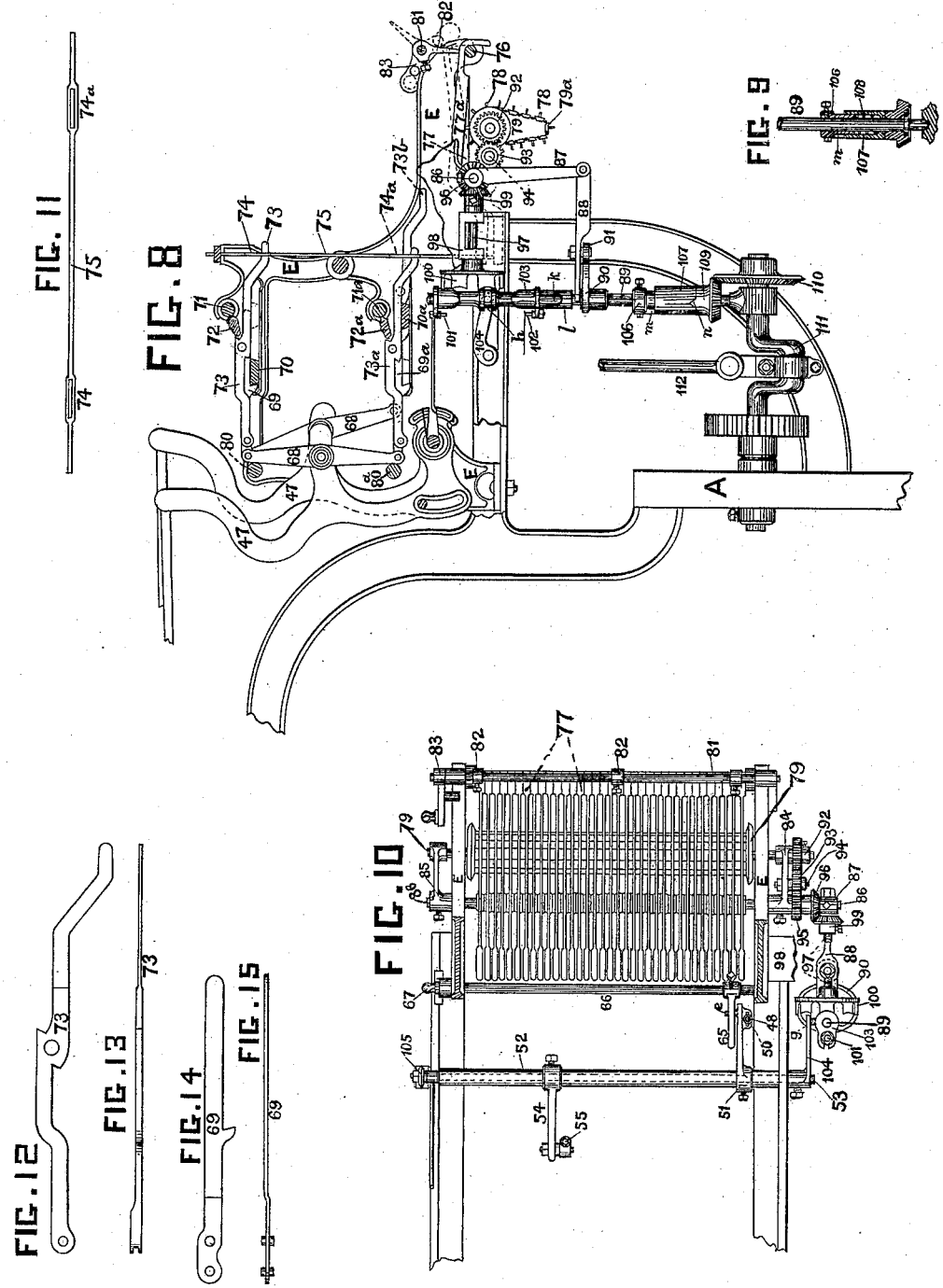

(No Model.) 7 Sheets—Sheet 5.
R. L. HATTERSLEY & J. HILL.
LOOM.
No. 383,465. Patented May 29, 1888.
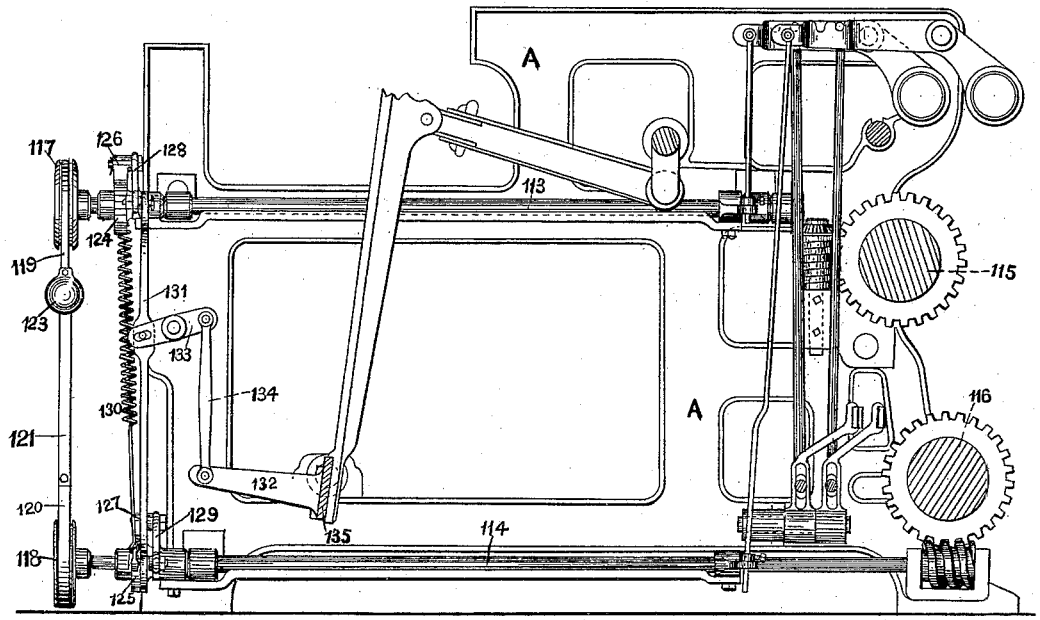
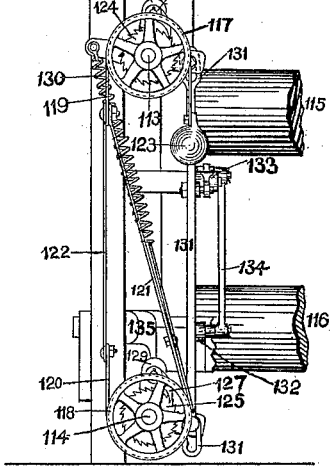
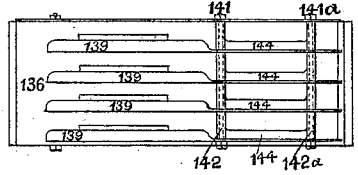
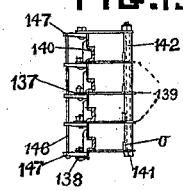
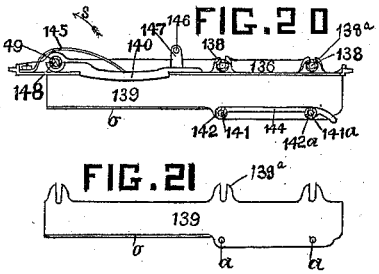
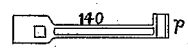
WITNESSES,
Samuel Hey.
R. Newsholme.
INVENTORS,
Richd L Hattersley
James Hill.

(No Model.) 7 Sheets—Sheet 6.
R. L. HATTERSLEY & J. HILL.
LOOM.
No. 383,465. Patented May 29, 1888.
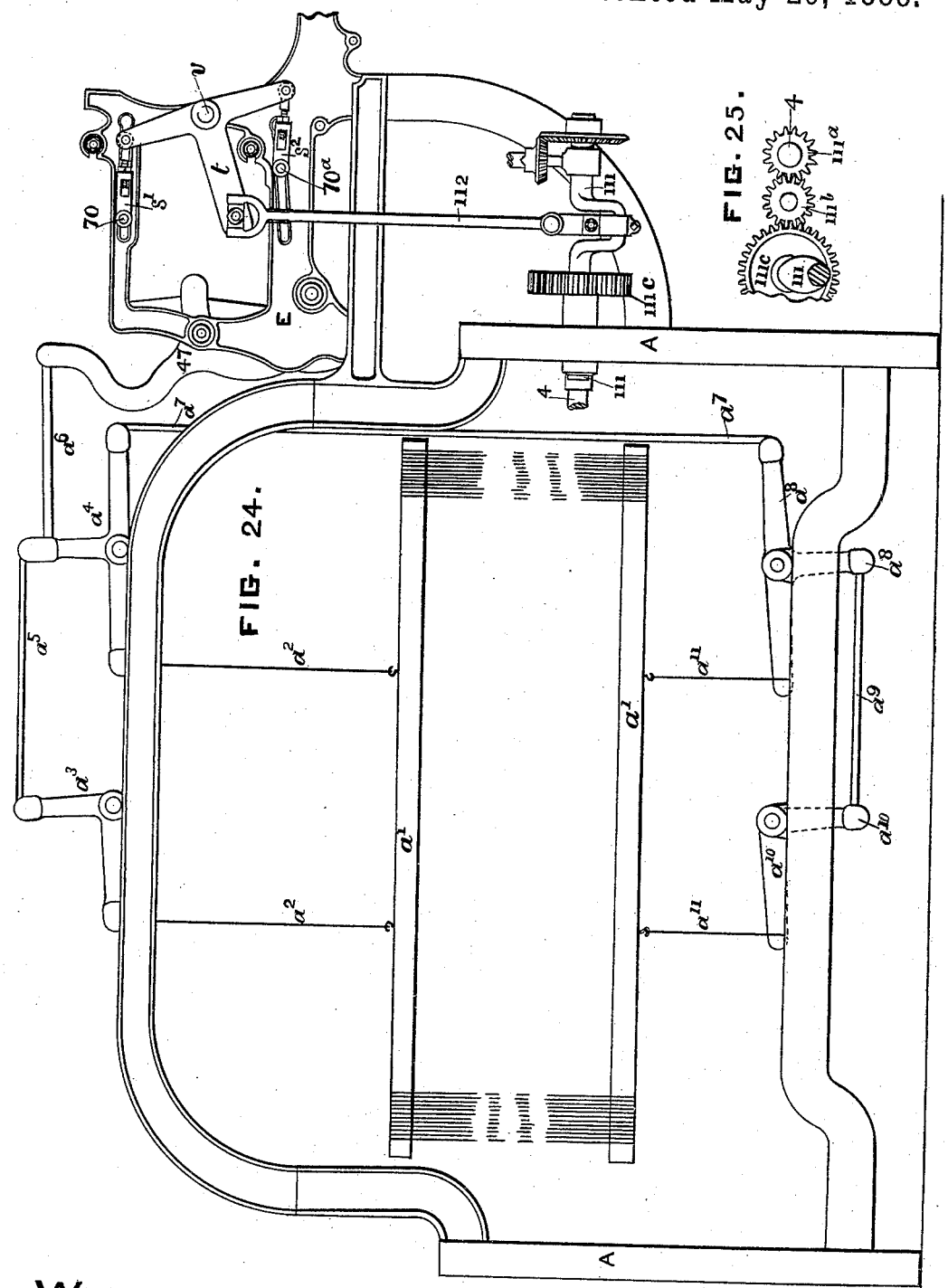
WITNESSES.
Samuel Hey.
John E. Hooson,
INVENTORS.
Rich L Hattersley.
James Hill.

(No Model.) 7 Sheets—Sheet 7.
R. L. HATTERSLEY & J. HILL.
LOOM.
No. 383,465. Patented May 29, 1888.
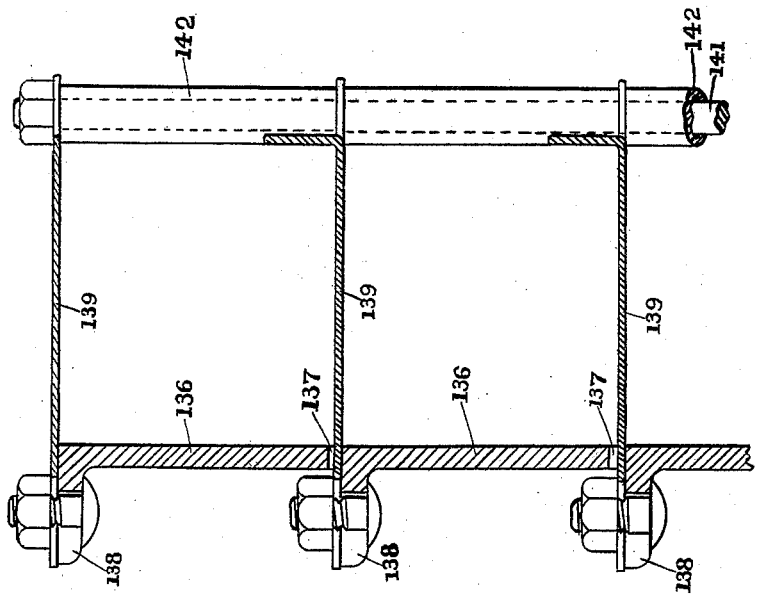
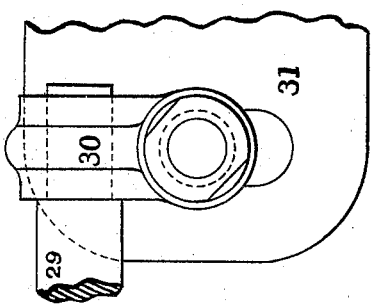
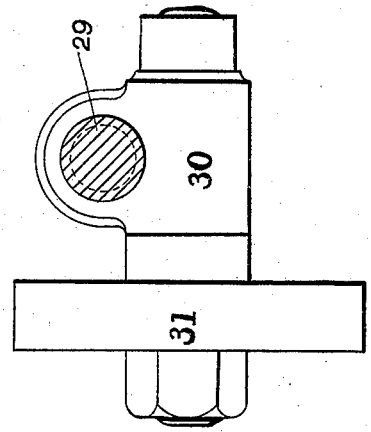
Witnesses.
Samuel Hey.
John E. Hooson.
Inventors.
Ruth L. Hattersley
James Hill.

UNITED STATES PATENT OFFICE.

RICHARD L. HATTERSLEY AND JAMES HILL, OF KEIGHLEY, COUNTY OF YORK, ENGLAND.

LOOM.

SPECIFICATION forming part of Letters Patent No. 383,465, dated May 29, 1888.

Application filed September 3, 1886. Serial No. 212,651. (No model.) Patented in England March 6, 1885, No. 2,954, and July 4, 1885, No. 8,109.

*To all whom it may concern:*

Be it known that we, RICHARD LONGDEN HATTERSLEY and JAMES HILL, subjects of the Queen of Great Britain, residing at Keighley, in the county of York, England, have invented certain new and useful Improvements in Looms, (for which we have received Letters Patent in England, No. 2,954, dated March 6, 1885, and also No. 8,109, dated July 4, 1885,) of which the following is a specification.

Our invention consists of new constructions, combinations, and arrangements of devices possessing the advantages and superiority hereinafter described, the new and improved features and combinations being particularly pointed out in the claims, reference being had to the accompanying drawings illustrative thereof, in which—

Figure 1:
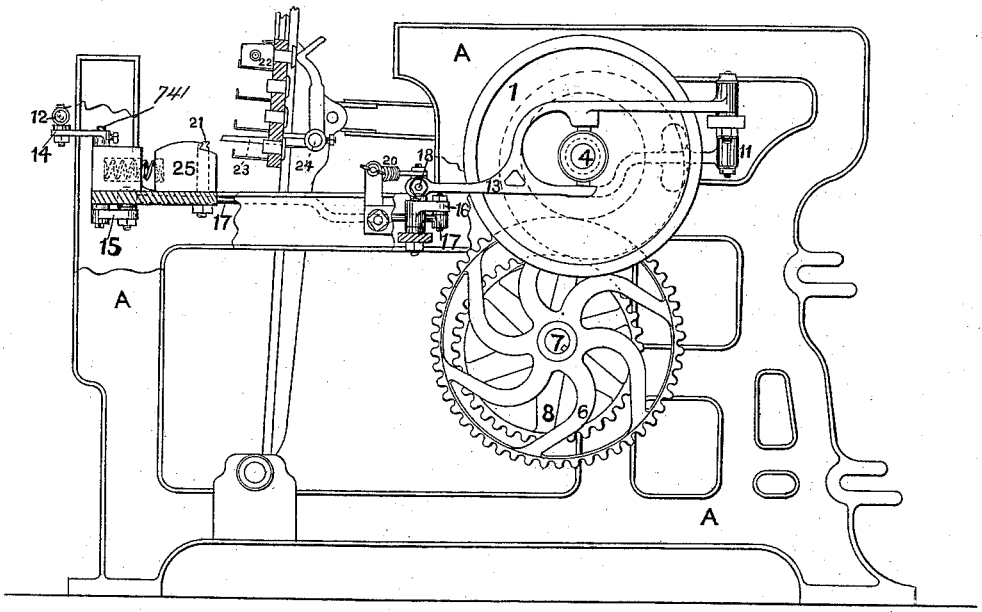
Figure 2:
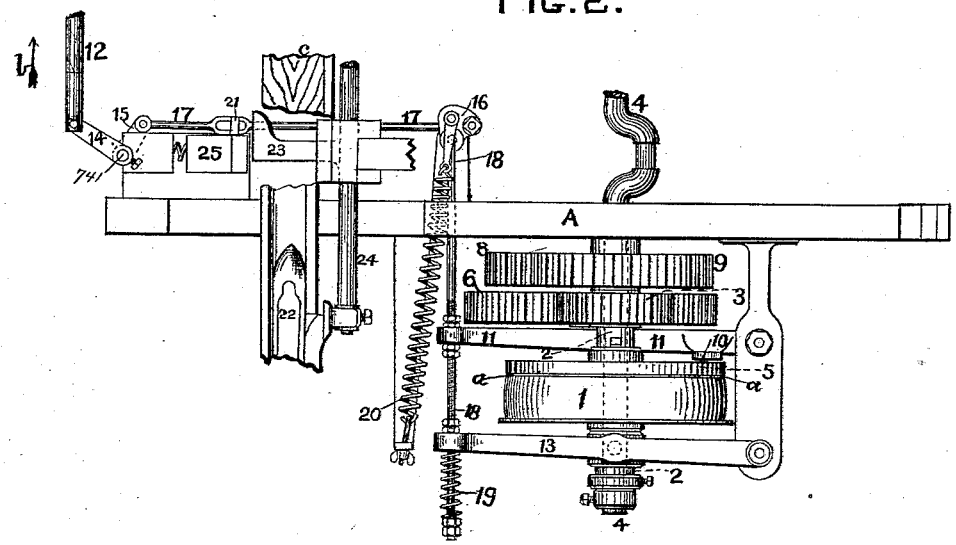
Figure 3:
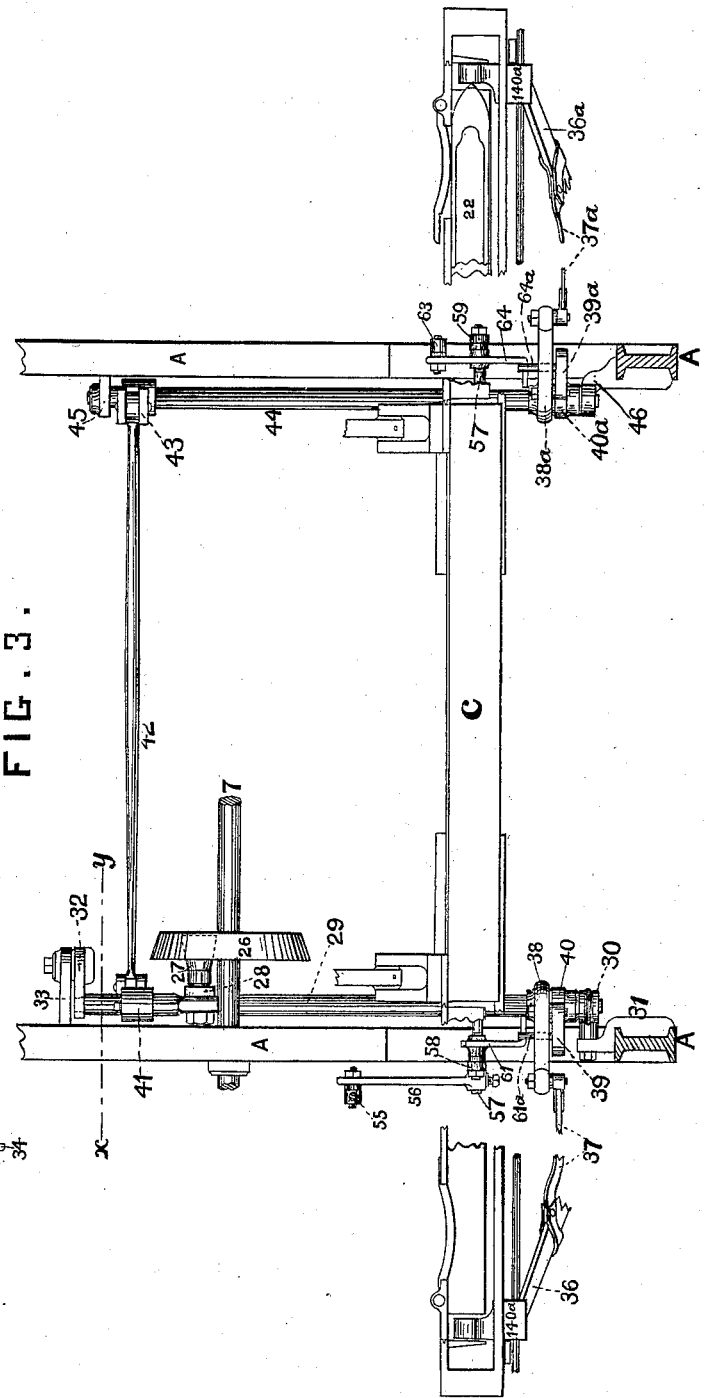
Figure 4:

Figure 1 is a side elevation of part of a loom to illustrate what is commonly and well known as the "driving mechanism" or "motion," suitable portions of the end frame being shown as cut away, so as to illustrate parts which it would otherwise have covered. Fig. 2 is a plan of a portion of Fig. 1. Fig. 3 is a plan of the picking mechanisms. Fig. 4 is a detail sectional elevation of a portion of Fig. 3 on line *x y*. Fig. 5 is a partly-sectional back elevation of a part of a loom, illustrating the joining of the picking mechanisms to the shedding motion or mechanism. Fig. 6 is a sectional detail view of part of Fig. 5. (Seen in the direction indicated by arrow *d*.) Fig. 7 is a view similar to Fig. 6, but illustrates the parts on the opposite end of the loom, and as seen when looking in the opposite direction to that indicated by the said arrow *d*. Fig. 8 is a partly-sectional back elevation of the shedding mechanism, showing the indicating-cylinder mechanism, but not in section. Fig. 9 is a sectional detail drawing of part of Fig. 8. Fig. 10 is sectional plan of Fig. 8. Figs. 11, 12, 13, 14, and 15 are detail drawings, on enlarged scale, of parts used in the shedding-motion. Fig. 16 shows a portion of the transverse section of a loom, with the apparatus for letting off the warp applied. Fig. 17 is a front elevation of a portion of Fig. 16. Figs. 18, 19, 20, 21, 22, and 23 are detail drawings illustrating the novel features in the construction of the shuttle-boxes. Fig. 24 is the back elevation of a loom, illustrating a method of imparting motion to the shedding mechanism; also an arrangement of levers and connecting-rods for coupling said shedding mechanism to the harnesses. Fig. 25 is a detail drawing of part of Fig. 24. Figs. 26, 27, and 28 are detail drawings, enlarged scale, which will hereinafter be referred to.

In all the drawings only such portions of a loom are shown as are necessary to illustrate our invention; and the devices required for the effectual operation of the loom in excess of those illustrated may be any of the common well-known kinds.

Like letters and figures of reference indicate like parts in all the drawings.

A represents the end frame of the loom.

The driving-pulley 1, which has a band or facing of leather or other such material, *a*, Fig. 2, fixed to its outer face, is mounted loosely, so as to revolve as well as slide upon the barrel or elongated boss 2 of a toothed wheel, 3, which revolves loosely on the outer end of the top or crank shaft, 4. Rigidly fixed to the said boss 2 is a circular metal plate or disk, 5, which when turned gives motion to the loom through the medium of the toothed wheel 3, gearing in a wheel, 6, rigidly keyed or fixed to the low or bottom shaft, 7, to which is also rigidly fixed the wheel 8, which gears with the wheel 9, fixed rigidly to the crank-shaft 4.

The gearings 8 and 9 may be of the usual straight or common kind, but, preferably, in most cases for broad looms we make them elliptical, so as to produce a fast and slow movement of the sley-board or lay *c*, for well-known purposes.

The disk 5 has each of its sides polished or otherwise prepared to form a suitable surface for contact with the facing *a* of the pulley 1 on one side and the leathered or other facing 10 of the brake-lever 11 on the other side. By the pulley 1, which has revolving motion imparted to it by belting or strapping in the usual well-known manner, having its surface *a* pressed against the disk 5, the loom is put into operation. This is accomplished by the operator moving the hand-bar 12 in the direction indicated by the arrow *b*, Fig. 2, and so placing the lever 13 through the medium of the arms 14, 15, (which are rigidly mounted at the top and bottom ends, respectively, of the upright rock-shaft 741, which is held loosely in its bearings, as illustrated by Figs. 1 and 2,) and 16, connecting-rods 17 and 18, and spring 19 (which spring yields sufficiently to compensate for the wearing away of the joints, as well as for the springing of the integral parts, so as to insure the leathered surface of the pulley 1 being always pressed in an appropriate degree against the disk 5) in the position shown in Fig. 2. By a reversal of the direction of motion of the hand-bar 12 the pulley 1 is thrown out of contact with the disk 5, and at the same time, by the brake-lever 11 being connected to the connecting-rod 18 and so to the arm or lever 16, which has attached thereto one end of spring 20, the surface 10 of the lever 11 is pressed against the opposite side of the disk 5, and so the motion of the loom is almost instantly arrested, the spring 20 acting upon the lever 16 to apply the brake when the said lever has been moved by the handle 12, as above described, sufficiently to carry the point at which the spring is attached to the lever forward of the center of motion of the lever.

We fix a projecting piece, 21, to the rod 17 in such a position that when the shuttle 22 fails to "box" properly while the loom is in motion, as is well understood, the finger or dagger 23 of the protector or stop-rod 24 shall come in contact with it and so automatically accomplish the reversal above described, before the said dagger 23 comes in contact with the buffer 25, thus avoiding concussion and strain upon the working parts incident to the abrupt arrest of their motion when encountering the buffer.

Respecting the arrangement and construction of the parts constituting the mechanism for imparting motion to the shuttle, commonly known as the "picking motion," the same may be described as follows: We rigidly fix a cam or tappet, 26, well known as the "picking-tappet," upon the low or bottom shaft, 7. Beneath it and in a suitable position to work in connection with it is the cone or picking-ball 27, which is loosely mounted on the stud 28, rigidly fixed to the horizontal shaft 29. The said shaft 29 is carried at one end by the swivel-joint 30, hinged to the bracket 31, (see Figs. 3, 27, and 28,) fixed to the end frame, A, and at the other end by the arm of a tumbling-lever, 32, which has for its fulcrum a stand, 33, also fixed to the end frame, A. The other arm of the tumbling-lever 32 is segmentally shaped and has formed in it a recess into which enters the end of the rod 34, the latter being pressed or pushed there by the spring 35, which, together with the rod 34, is carried by the stand 33. From this it will be seen that should anything interfere to prevent the proper working of the picking-stick 36 when picking, which is directly and positively connected by the use of leather strap 37, lever 38, catch 39, and notched plate 40 to the shaft 29, the extra strain thereby put on the said shaft 29 will overcome the pressure of the spring 35 (which is only of sufficient strength to withstand the picking of the shuttle in an ordinary way) and force the rod 34 out of the recess in the segment of the lever 32. Thus the picking-ball 27, together with the shaft 29, will yield to the cam or tappet 26 without throwing or picking the shuttle, and so prevent any breakages.

The foregoing is a description of the picking mechanism on one side of the loom only; but to carry or convey motion to the opposite side we mount rigidly on the shaft 29 the swape or lever 41, to which is hinged the connecting-rod 42, which reaches from the swape 41 to a similar swape, 43, rigidly mounted on the shaft 44, the said shaft 44 being mounted (but to revolve only) in the bearings 45 and 46, fixed to the end frame, A, and carrying a notched plate, 40$^a$, lever 38$^a$, catch 39$^a$, and leather strap 37$^a$ as connecting parts to the picking-stick 36$^a$ in a similar manner to the shaft 29; but as it is not operated on directly by the picking-cam 26 it is not necessary to mount it (the shaft 44) in yielding bearings, as is the shaft 29.

To put the above-described picking mechanism into and out of operation at will, we make use of such parts in the shedding mechanism as are usually employed for operating one division of the harnesses, (the said shedding mechanism, together with the arrangement of its pattern-surface, being hereinafter described,) with the exception that the jack-lever 47 is turned with its projecting end 47$^a$ outwardly instead of inwardly.

The outwardly-projecting end 47$^a$ is coupled by means of the connecting-rod 48 and yielding springs 49 and 50 to the lever-arm 51, fixed on the tube 52, mounted upon the shaft 53, the further use of which shaft is hereinafter described.

Fixed to the tube 52 is another lever-arm, 54, which by the connecting-rod 55 and lever 56 is coupled to the shaft or rod 57, mounted loosely in bearings 58 and 59, fixed to the end frame, A. This shaft or rod 57 operates through the levers 60 and 61 and pin 61$^a$ on the catch 39 on one side of the loom, and through the lever 62, connecting-rod 63, lever 64, and pin 64$^a$ on the catch 39$^a$ on the other side of the loom, in such a manner that when the catch 39 is put into gear with the notched plate 40 the catch 39$^a$ is held out of gear with the notched plate 40$^a$, or when the catch 39$^a$ is put into gear with the notched plate 40$^a$ then the catch 39 is held out of gear with the notched plate 40, so that it shall be impossible for the picking mechanisms on both sides of the loom to be put into operation at one and the same time. Moreover, by adjusting the levers 61 and 64 so as slightly to elevate one catch—let us say the catch 39—and slightly lower the other catch, which in this case would be 39$^a$, so that they are each held clear of the notched plates 40 and 40$^a$, respectively, then the picking of the shuttle is discontinued—an object that is very essential during the well-known process of "lagging" back.

In order to adjust and hold both of the catches 39 and 39$^a$ out of gear with the notched plates 40 and 40$^a$, as above described, we mount an inclined lever-arm, 65, upon the horizontal shaft 66, carried by the frame-work E, in such a manner that when the said shaft 66 is manually operated upon by means of the handle 67 (see Fig. 10) the said inclined arm 65 operates upon a pin, $e$, fixed to the lever-arm 51, depressing the said arm 51, if found in its raised position, as is shown by Fig. 5, and lifting it, if found in its lowered position, sufficiently far to place the catches 39 and 39$^a$ in the position above described. This is effected by one or other of the springs 49 and 50 yielding the required distance, so that, though the lever-arm 47$^a$ is held rigidly in its raised and lowered positions, the lever-arm 51, which is coupled to it, can be moved as much as is required for the purpose before described.

The shedding mechanism is an improved form of that which is well known in England as Hattersley's positive dobby, the latter being the type of shedding mechanism wherein one lever is mounted on another, catches being attached to the latter for each division of the harnesses, so that reciprocating bars may act thereon, raising, retaining, and pulling down each said division as may be required.

To each of the swing-levers 68, which are mounted on the jack-levers 47, we hinge the catches 69 and 69$^a$, which are made or formed so as only to be pushed by their respective reciprocating bars 70 and 70$^a$, with which they work in connection. The reciprocating motion is imparted to the said bars 70 and 70$^a$ through the connecting-rods $s'$ $s^2$, three armed lever $t$, which is rigidly mounted upon the shaft $v$, to the other end of which is attached in a similar manner a two-armed lever, which is coupled by connecting-rods to the other ends of the said bars 70 and 70$^a$, and the connecting-rod 112 from the crank 111, which derives its rotary motion from the crank-shaft 4 of the loom by means of the gears 111$^a$, 111$^b$, and 111$^c$. (See Figs. 24 and 25.) The outer ends of the before-named catches 69 and 69$^a$ are extended a distance equal to that moved by the said bars 70 and 70$^a$, (see Figs. 14 and 15,) and rest upon the said bars, the said outer ends also passing under the shafts 71 and 71$^a$, upon which are hinged the stop-bars 72 and 72$^a$, respectively, so that it is not possible for the catches 69 and 69$^a$ to get out of proper contact with their respective bars 70 and 70$^a$.

The above-named catches 69 and 69$^a$ have also hinged to them the catches 73 and 73$^a$, respectively, (see Figs. 12 and 13,) the said catches 73 and 73$^a$ being formed to be pulled or drawn by their respective bars 70 and 70$^a$, over which they also extend, each of them (the catches 73 and 73$^a$) having formed on its upper edge a notch or catch, which engages with the stop-bar 72 or 72$^a$, as the case may be, when not in operation or acted upon by the pattern-surface of the pattern-cylinder. The outer ends of the said catches 73 and 73$^a$ further extend and pass through holes or loops 74 and 74$^a$, formed in the upright rod or needle 75, and are of a suitably-inclined shape—that is, they are bent, as is illustrated by Fig. 12, so that the said outer ends may be a suitable distance beneath the bodies of their respective catches when fitted or mounted in the machine, in order that the said needle 75 may operate freely on one catch when the other is drawn with its outer and lower end clear of same by its bar 70 or 70$^a$.

Fixed to the frame-work E is a shaft, 76, which forms the fulcrum in an ordinary way for the series of levers 77 77$^a$, which correspond in number to the series of needles 75, each of the said levers 77 77$^a$ reaching under the end of one of the said needles 75. As will be seen, when a peg or pin, 78, on the pattern or peg-lags 79$^a$ presents itself or is turned to the top of the said cylinder 79, any one of the levers 77 77$^a$ lying in its path of motion will be lifted; so also will the needle 75 and its respective catches 73 and 73$^a$, (the said catches 73 and 73$^a$ being thus placed in contact with their respective stop-bars 72 and 72$^a$,) in this manner leaving the jack-levers 47 inoperative and the harnesses in their lowest positions, as will be well understood. However, should there not be a peg, 78, thus turned to the top of the said cylinder 79, then the lever 77 or 77$^a$ will remain down, and so will its respective needle 75 and catches 73 73$^a$; but as only one of the bars 70 or 70$^a$ can possibly be in position to receive and act upon one or the other of the said catches 73 and 73$^a$, (in Fig. 8 the bar 70 is in position for receiving the catch 73, and would have done so had there not been the peg 78 under the lever 77 at this time of their movements,) the catch thus received is drawn by the said bar, (as catch 73$^b$ is shown drawn by 70$^a$,) and, by its swing-lever 68 utilizing one or the other of the stationary bars 80 80$^a$ as a fulcrum, raises the jack-lever 47, and of course also raises the harness $a'$, connected to said lever 47 by the cords $a^2$ $a^2$, levers $a^3$ and $a^4$, and connecting-rods $a^5$ and $a^6$, (see Fig. 24,) while the other catch, 73 or 73$^a$, rests inactively with its straight bottom edge upon the other bar, which was not in position to receive and act upon it (the bar 70$^a$ being the one shown out of position) until the pattern-cylinder 79 is further turned. Then, should there still not be a peg, as before described, the catch 73 or 73$^a$, which was inactive on account of its bar 70 or 70$^a$ not being in position, but which has now moved into position, is now received and acted upon by its appropriate bar, and so the harness $a'$ is kept in its elevated position; but if a peg had to present itself when the pattern-cylinder 79 is so turned, the catch 73 or $73^a$ will be lifted (as one or the other will at this time be drawn with its inclined end clear of the loop in the needle) out of position or connection with the bar 70 or $70^a$ into position for engagement with the stop-bar 72 or $72^a$, and consequently, by one or the other of the bars 70 or $70^a$ coming in contact with the projection on the catch 69 or $69^a$, the jack-lever 47 is pressed back or down through the swing-lever 68, utilizing as a fulcrum one or the other of the catches 73 or $73^a$, which is now held firmly in that direction by the stop-bar 72 or $72^a$. Thus the harness $a'$ is pulled down through the use of the connecting-rod $a^6$, lever $a^4$, connecting-rod $a^7$, lever $a^8$, connecting-rod $a^9$, lever $a^{10}$, and cords $a^{11}$, (see Fig. 24,) as will readily be seen.

The stop-bars 72 and $72^a$ are hinged in order to prevent any breakages that might be caused, had they to be rigid, by the thick part of the catches 73 and $73^a$ being caught between them and the bars 70 and $70^a$, respectively.

In order to bring the harnesses level with each other, so as to put all the threads of warp into the same plane for the purposes of repairing the broken ones, &c., we mount a shaft, 81, in the framing E, upon which is hinged the rib 82, which may be operated upon by the handle 83. When the loom is in proper order for weaving, the rib 82 is brought to press upon the ends of the levers 77, thus acting as a fulcrum when the said levers are raised, but by turning the handle 83, so as to bring the rib 82 into the position shown by dotted lines in Fig. 8, these ends of the levers are liberated, so that when the pattern-surface is pressed against them, instead of the latter operating the ends in connection with the needles, these liberated ends, by the shaft 86 becoming the fulcrum, are raised and sustained by the pressure of their respective needles and catches upon the opposite ends, so that all the catches 73 and $73^a$ are put into connection with their respective draw-bars 70 and $70^a$, and at the next movement of the loom the object desired is accomplished.

When it is found, as is often the case that there is a greater number of jack-levers 47 than required for the actual production of design in the material being woven, by lifting the number of levers 77 not required, and sliding the same so as to place them in position, as is shown in dotted lines, Fig. 5, beyond the reach of the pattern-surface, the desired number may be thrown out of operation.

The pattern mechanism that regulates the movements of the hereinbefore-described shedding mechanism consists of a barrel, 79, of the usual construction, around which passes in the usual manner the pattern-chain of peg-lags $79^a$; but to this barrel 79, in addition to its usual intermittent rotary motion, we impart a vertically-oscillatory or rising-and-falling movement, so that the said barrel 79 is lowered, partly revolved in either direction, and then raised to press its pattern surface against the series of levers 77, as and for the purpose hereinbefore described.

To accomplish the movements, as above named, of the barrel 79, we mount it by its shaft loosely on the lever-arms 84 and 85, Figs. 5 and 10, the other ends of which are rigidly fixed to the shaft 86, which is mounted loosely on the frame-work E. Fixed to the shaft 86 is the lever 87, having hinged to it the forked connecting-rod 88, the forked end of which is made to span the upright revolving shaft 89 and rest upon the boss of the cam 90 fixed thereon, in this manner being held in proper position.

Attached to the rod 88 is an anti-friction bowl, 91, which by the weight of the barrel 79 is kept in constant contact with the cam 90, as will readily be understood, and from this it will be seen that as the said cam 90 revolves the barrel 79 is raised and lowered. Intermittent rotary motion is imparted to the said barrel 79 by fixing the toothed wheel 92 upon the shaft of the said barrel 79 and gearing it to the wheel 93, which is loosely mounted on the stud 94, fixed to the arm 84. The said wheel 93 is further geared with the wheel 95, which is rigidly attached to the bevel-wheel 96, and which together are mounted loosely on the shaft 86.

Rigidly fixed to the shaft 97, which is mounted in bearings 98, fixed to the frame-work E, is the bevel-wheel 99, which gears with the wheel 96. Fixed, also, to the shaft 97 is the crown-wheel 100, which is operated upon by one or the other of the pins 101 or 102, (according to the direction in which it is required to be driven,) carried by the nogging-wheel 103, fixed to revolve with the shaft 89. From this it will be seen that as the said nogging-wheel 103 revolves (which is always in the same direction) the crown-wheel 100 will be moved one change forward or backward by the pin 101 coming into contact with its upper edge or by the pin 102 coming into contact with its lower edge, respectively, as the case may be, and that the intermittent motion thus produced will be imparted through the gearing above described to the barrel 79, and, again, that this will be produced simultaneously with its rising and falling movements, each movement being arranged so as to work in concert with the other, in order that the desired result may be obtained, as hereinbefore set forth.

The position, up or down, of the nogging-wheel 103 is regulated by a pin, $g$, on the lever 104, fixed to the shaft 53, the said shaft being manually operated upon by handle 105, the said pin $g$ entering into a groove, $h$, in the nogging-wheel 103. The said wheel 103 is allowed to move a suitable distance up and down on the shaft 89 without its prongs $k$ coming out of gear with the coupling-piece *l*, which is rigidly fixed to the shaft 89, and through which revolving motion is imparted to the wheel 103.

The object of making the direction of motion of the pattern-barrel reversible is to allow the loom to be run in the ordinary forward direction, while at the same time the pattern-surface is being turned in a backward direction, the picking motion at this time being discontinued in the manner hereinbefore described, so that any faulty place in the piece being woven—such as broken shots of filling, &c., that may have accidentally been passed over while weaving—may be turned back to and repaired.

In order to avoid breakages of any of the parts in the pattern mechanism we have attached a yielding coupling to the shaft 89, the said coupling consisting of a fixed boss, 106, to which is attached a key, *m*, which engages with the cover or box 107, in which is placed the spring 108, (see Fig. 9,) one end of which is in contact with the fixed boss 106, and the other with a flange part formed internally on the box 107, so that the said box is pressed against the boss of the bevel-gear 109, which receives motion from the gear 110, fixed to the crank 111, the said crank being used for transmitting motion to the shedding mechanism through the connecting-rod 112, as before described.

Upon the boss of the gear 109 is formed a small projection, *n*, (preferably V-shaped,) which enters a suitably-shaped notch in the box 107, so that as the gear 109 revolves, the shaft 89 is revolved by the projection *n*, box 107, key *m*, and boss 106; but should anything interfere with its working, then the strength of the spring 108 is overcome by the projection *n* pressing against the side of the notch, and the box 107 rises clear of it, as will be seen.

We make use of the form of mechanism for letting off the warp known as the "worm and wheel let-off;" but we arrange it so that though one or two warp beams or rolls may be used only one movement is required for unwinding the warp from them.

As usual, the shafts 113 and 114, which turn the warp-beams 115 116 by means of the bevel-gear worms 201 202 203 204 and worm-gears 205 206, as shown by Fig. 16, extend from the back to the front part of the loom, in order that the weaver may, by the hand-wheels 117 and 118, fixed to the shafts 113 and 114, respectively, operate on the said warp-beams 115 and 116, as is from time to time found necessary. The said hand-wheels 117 and 118 form friction-wheels, partly around each of which passes a leather strap, 119 or 120, the said straps 119 and 120 being joined together by the iron or other metal straps 121 and 122, so that the weight 123 is sufficient to weight them both. In order to equalize the friction on the said wheels 117 and 118, since the wheel 117 according to this arrangement has double the amount of frictional weight upon it of that upon the wheel 118, we make the strap 119 only one-half the width of the strap 120.

Upon the shafts 113 and 114 are fixed the ratchet-wheels 124 and 125, which are operated upon by the pawls 126 and 127, mounted loosely upon the arms of the levers 128 and 129, respectively, the said levers 128 and 129 being mounted loosely on their respective shafts 113 and 114, one above the other. We are thereby enabled to pull them both in the same direction by the spring 130, by which the return movement of the pawls 126 and 127 is obtained, and, again, we are also enabled to act upon or pull them in the other direction, as also the pawls 126 and 127 carried by them with one and the same movement by joining or operating upon these levers 128 and 129 by the suitably-slotted connecting-rod 131. The slots in the said rod cause it to act in one direction upon these levers, this direction being the one in which the pawls 126 and 127 operate upon the ratchet-wheels 124 and 125, for the purpose of unwinding the warp from the warp-beams 115 and 116. It will be seen, therefore, that one movement, which we derive by the levers 132 and 133 and connecting-rod 134 from the swing-rail 135, upon which is mounted the going part or sley-board of the loom, gives the upward and downward movements desired.

We construct the shuttle-box, which is of the well-known drop-box kind, by forming the whole of its back part, 136, Figs. 18, 19, and 20, in one piece of metal, with openings 137 and projections 138 for the insertion and fixing of each of the box-shelves 139 (the said shelves 139 being securely fastened with their bifurcations 139$^a$ to the said projections 138 by the bolts 138$^a$, (see detail drawing, enlarged scale, Fig. 26) and swell-lever 140 separately, so that any one can be removed for repairs, &c., without disturbing or in any way interfering with the other; and in order to give additional firmness to the said box-shelves 139 we have as much of the front outer edge of each box-shelf to project outward unturned up as the traverse of the picker 140$^a$, Fig. 3, will allow, and through each of the two front corners of the said unturned-up part in each shelf 139 is a hole, *a a*, so that a bolt, 141 or 141$^a$, may be inserted perpendicularly through the whole series of shelves 139 at each of the said corners respectively. To hold the said shelves 139 firmly, and yet at their proper distances apart, we place in each compartment two tubes, 142 and 142$^a$, of suitable dimensions, one at each of the above-named corners, straight in line with the holes *a a*, so that the bolts 141 and 141$^a$, in passing through the series of box-shelves 139, pass through the series of tubes 142 and 142$^a$, the screws or nuts of which, when tightened, bind the whole firmly together.

To keep the filling of each shuttle from being disarranged while the shuttle is in the shuttle-box, we join each of the tubes 142 to each of the tubes 142ᵃ in the several compartments by a strip of metal, 144, which acts in a similar manner to the turned-up portion o in the other part of the said box-shelves 139.

The swell-lever 140 is made with the outer side of its boss p, Figs. 22 and 23, open or cut away, so that by taking its loose end and turning it outward in direction indicated by arrow s, Fig. 20, the open side of its boss is turned toward the box-back 136, and so the said swell-lever 140 is free to be taken out for repairs or replacement by a new one without necessitating the loosening of bolts, joints, &c., as is usual, to effect its liberation.

To keep the swell-levers 140 from falling out of their places, should any of the springs 145 break, we pass a pin, 146, through holes in projections 147, formed on the back part, 136. The pin 148, upon which the swell-lever 140 is hinged, is covered or protected at that part which comes in contact with each of the said swell-levers 140 by a hoop or tube 149, which, when worn, can be replaced without necessitating the replacement of the pin itself.

In order to render the foregoing description more exact and comprehensible, several old and well-known contrivances may have been included. To these we do not wish to lay any claim; but What we do consider as new and of our invention, and therefore claim, is—

1. The combination, with the frictional driving-pulley 1, the disk 5, the gear-wheel 3, said pulley and disk being mounted on the boss of said gear-wheel, the former being loose and the latter fast to said boss, shaft 4, the gear-wheels 6 and 8, shaft 7, and the gear-wheel 9, rigidly mounted on shaft 4, of the levers 11 and 13, the rods 17 and 18, the springs 19 and 20, the levers 16, 15, and 14, the shaft 741, and the handle 12, said rods, springs, levers, and handle operating said levers 11 and 13, substantially as and for the purpose specified.

2. The projecting piece 21, the dagger 23, which operates said projecting piece, the stop-rod 24, to which said dagger is attached, and the lay c, in combination with the rod 17, the lever 16, connected to said rod, the spring 20, operating in connection with said lever 16, the rod 18, also joined to lever 16, the lever 11, and the disk 5, all arranged to operate substantially as and for the purpose specified.

3. The combination of the shaft 29 and the joint 30, in which said shaft is swiveled, with the tumbling-lever 32, the rod 34, which enters into the notch of said tumbling-lever 32, and the spring 35, all arranged to operate substantially as and for the purpose specified.

4. The combination, with the picking-cam 26, shaft 7, the cone 27, the stud 28, and the shaft 29, to which said stud 28 is attached, of the swivel-joint 30, the tumbling-lever 32, which, with said joint 30, carries said shaft, and rod 34, with its spring 35, all arranged to operate substantially as and for the purpose specified.

5. The lever 56, the connecting-rod 55, the levers 54 and 51, the sleeve or tube 52, the rod 48, the jack-lever having the arm 47ᵃ, which, through said rods and levers, operates said lever 56, the means for actuating said jack-lever, the shaft 57, the lever 60, attached to said shaft, and the lever 61, operated by said lever 60, in combination with the pin 61ᵃ, the catch 39, to which said pin is attached, the arm 38, carrying said catch, the picking-stick 36, the strap 37, joining said arm and picking-stick together, the notched piece 40, the shaft 29, to which said notched piece is attached, the cam 26, the bowl 27, and the stud 28, substantially as and for the purpose specified.

6. The lever 56, the connecting-rod 55, the levers 54 and 51, the sleeve or tube 52, the rod 48, the jack-lever 47, having arm 47ᵃ, which, through said rods and levers, operates said lever 56, the means for actuating said jack-lever, the shaft 57, the lever 62, attached to said shaft, and the lever 64, joined to said lever 62 by rod 63, in combination with the pin 64ᵃ, the catch 39ᵃ, to which said pin is attached, the arm 38ᵃ, carrying said catch, the picking-stick 36ᵃ, the strap 37ᵃ, joining said arm and picking-stick together, the notched piece 40ᵃ, the shaft 44, the swape 43, the rod 42, the swape 41, the shaft 29, said shaft operating the shaft 44 by said swapes and rod, and the means for operating shaft 29, substantially as and for the purpose specified.

7. The combination of the jack-lever 47, having an arm, 47ᵃ, the lever 68, the catches 73 and 73ᵃ, and the reciprocating draw-bars 70 and 70ᵃ, by which said jack-lever 47 is operated, with the connecting-rod 48, the yielding springs 49 and 50, mounted on said rod 48, the levers 51 and 54, the sleeve or tube 52, the connecting-rod 55, attached to said lever 54, the lever 56, the shaft 57, which is operated by said jack-lever 47 by means of said springs and rods, the levers 60 and 61, the pin 61ᵃ, the catch 39, the lever 62, the rod 63, the lever 64, the pin 64ᵃ, the catch 39ᵃ, the picking-sticks 36 and 36ᵃ, the arms 38 and 38ᵃ, straps 37 and 37ᵃ, notched plates 40 and 40ᵃ, and means for operating the said plates, substantially as and for the purposes specified.

8. The combination of the lever 65, the shaft 66, and the handle 67, said lever and handle being mounted on said shaft, with the lever 51, the springs 49 and 50, the said lever 51 being permitted to move by the yielding of the said springs 49 and 50, the rod 48, jack-lever 47, having the arm 47ᵃ, with said rod attached to it, means for operating the said lever, the sleeve 52, the lever 54, the rod 55, attached thereto, the lever 56, engaging with said rod, the shaft 57, to which lever 56 is attached, the levers 60 and 62, mounted on said shaft, the rod 63, the lever 64, joined to lever 62 by said rod 63, the lever 61, the pins 61ᵃ and 64ᵃ, operated upon by said levers 61 and 64, respectively, the catches 39 and 39ᵃ, to which said pins 61ᵃ and 64ᵃ are respectively attached, the notched pieces 40 and 40ᵃ, the means for operating said notched pieces, arms 38 and 38ª, straps 37 and 37ª, and picking-sticks 36 and 36ª, all arranged to operate substantially as and for the purposes specified.

9. The combination of the jack-lever 47 and the lever 68 hinged thereto with the catches 69, 69ª, 73, and 73ª, the said catches 69 and 69ª being hinged to the lever 68 and the catches 73 and 73ª being hinged to the catches 69 and 69ª, respectively, the reciprocating draw-bars 70 and 70ª, and the needle 75, for operating on said catches, the lever 77, the peg 78, the pattern-chain 79ª, and the barrel 79, all arranged to operate substantially as and for the purposes specified.

10. The combination of the catches 73 and 73ª, formed with their outer ends of an inclined shape, with the needle or rod 75, having loops or openings 74 and 74ª to receive said catches 73 and 73ª, the catches 69 and 69ª, to which said catches 73 and 73ª are hinged, respectively, the lever 68, the jack-lever 47, the reciprocating draw-bars 70 and 70ª, the crank 111, the rod 112, lever $t$, and rods $s'$ $s^2$, shaft 4, and gears 111ª, 111ᵇ, and 111ᶜ, all arranged to operate to the end set forth.

11. The combination of the hinged stop-bars 72 and 72ª with the catches 73 73ª and 69 69ª, the former catches, 73 73ª, being hinged to the latter, the lever 68, to which catches 69 and 69ª are hinged, the jack-lever 47, the draw-bars 70 and 70ª, the crank 111, the rod 112, lever $t$, and rods $s'$ $s^2$, all arranged to operate to the end set forth.

12. The combination of the series of levers 77, the barrel 79, and the pattern-chain with the series of looped needles 75, the series of catches 73 and 73ª, the series of catches 69 and 69ª, the series of levers 68, the series of jack-levers 47, on which the series of levers 68 is mounted, said series of levers 68 carrying said series of catches 69 69ª, on which are mounted the said series of catches 73 and 73ª, respectively, and the draw-bars 70 and 70ª, which operate upon the two series of catches 69 69ª and 73 73ª, the driving-crank 111, the rod 112, the lever $t$, and the rods $s'$ and $s^2$, all arranged to operate substantially as and for the purpose specified.

13. The combination of the pattern-barrel 79, the series of levers 77, the pattern-chain on said barrel, the series of needles 75, the two series of catches 73 73ª, said catches being operated by said levers 77 and said needles 75, the two series of catches 69 69ª, the levers 68, the jack-levers 47, the reciprocating draw-bars 70 and 70ª, which operate said series of catches 69 and 69ª, 73 and 73ª, the rods $s'$ $s^2$, the lever $t$, the rod 112, the crank 111, said rods, lever, and crank operating said bars 70 and 70ª, the levers 84 and 85, on which said barrel 79 is mounted, the gear-wheels 92, 93, 95, and 96, the shaft 97, the wheel 99, the crown-wheel 100, the nogging-wheel 103, the pins 101 and 102, the shaft 89, from which intermittent motion is derived, the shaft 86, upon which said levers 84 and 85 are mounted, the lever 87, fixed to said shaft, the rod 88, attached to said lever, the anti-friction bowl 91, mounted on said rod, the cam 90, fixed on said shaft 89, by which cam, bowl, rod, levers, and shaft vertically-oscillatory motion is imparted to the said pattern-barrel 79, the yielding coupling, and the gear-wheels 109 and 110, which impart rotary motion to the shaft 89, substantially as and for the purposes specified.

14. The combination of the upright revolving shaft 89, the yielding coupling consisting of box 108, spring 107, boss 106, and key $m$, the gear-wheels 109 and 110, and the shaft of the driving-crank 111 with the nogging-wheel 103 and its pins 101 and 102, the crown-wheel 100, the shaft 97, the gear-wheels 99, 96, 95, 93, and 92, the pattern-barrel 79, the levers 84 and 85, the shaft 86, the lever 87, the rod 88, and cam 90, through and by which the vertically-oscillatory motion of the said barrel 79 is derived from said shaft 89, substantially as and for the purposes specified.

15. The combination of the rib 82 and the handle 83, by which it is manually operated, with the series of levers 77, the series of needles 75, and the two series of catches 73 and 73ª, by the pressure or weight of which catches 73 and 73ª and needles 75 the said levers 77 are raised at their outer ends when the said rib 82 is removed, the pattern-chain, the barrel 79, and the reciprocating draw bars 70 and 70ª, substantially as and for the purpose specified.

16. The combination of the ratchet-wheels 124 and 125 and their respective pawls 126 and 127 with the levers 128 and 129, upon which said pawls 126 and 127 are respectively mounted, the spring 130, attached to said levers 128 and 129, the rod 131, the levers 132 and 133, the rod 134, and the swing-rail 135, for operating said levers 128 and 129, substantially as and for the purpose specified.

17. The combination of the friction wheels 117 and 118 and the straps 119 and 120, partly encompassing said wheels, with the straps 121 and 122, for joining together the straps 119 and 120, and the weight 123, all arranged to operate substantially as and for the purpose specified.

18. The combination of the back part, 136, having openings 137 made therein and projections 138, with the shelves 139, having bifurcations 139ª, the bolts 138ª, and the swell-levers 140, substantially as and for the purpose specified.

19. The combination of the bolts 141 and 141ª, the shelves 139, through which said bolts pass, the back part, 136, the swell-levers 140, and the pin 148 with the tubes 142 and 142ª and the tube 149, all arranged and constructed substantially as and for the purpose specified.

20. The combination of the strips of metal 144 with the tubes 142 and 142ª, the bolts 141 and 141ª, the shelves 139, and the back part, 136, all constructed and arranged substantially as and for the purpose specified.

21. The combination of the swell-lever 140, constructed with its end $p$ open, with the pin 146, the back part, 136, and the pin 148, all constructed and arranged substantially as and for the purpose specified.

22. The combination of the swell-lever 140, constructed with its end $p$ open, and the pin 146 with the tube 149, the pin 148, and the back part, 136, all constructed and arranged substantially as and for the purpose specified.

RICHD. L. HATTERSLEY.
  JAMES HILL.

Witnesses:
 SAMUEL HEY,
 JOHN E. HOOSON.